UNITED STATES PATENT OFFICE.

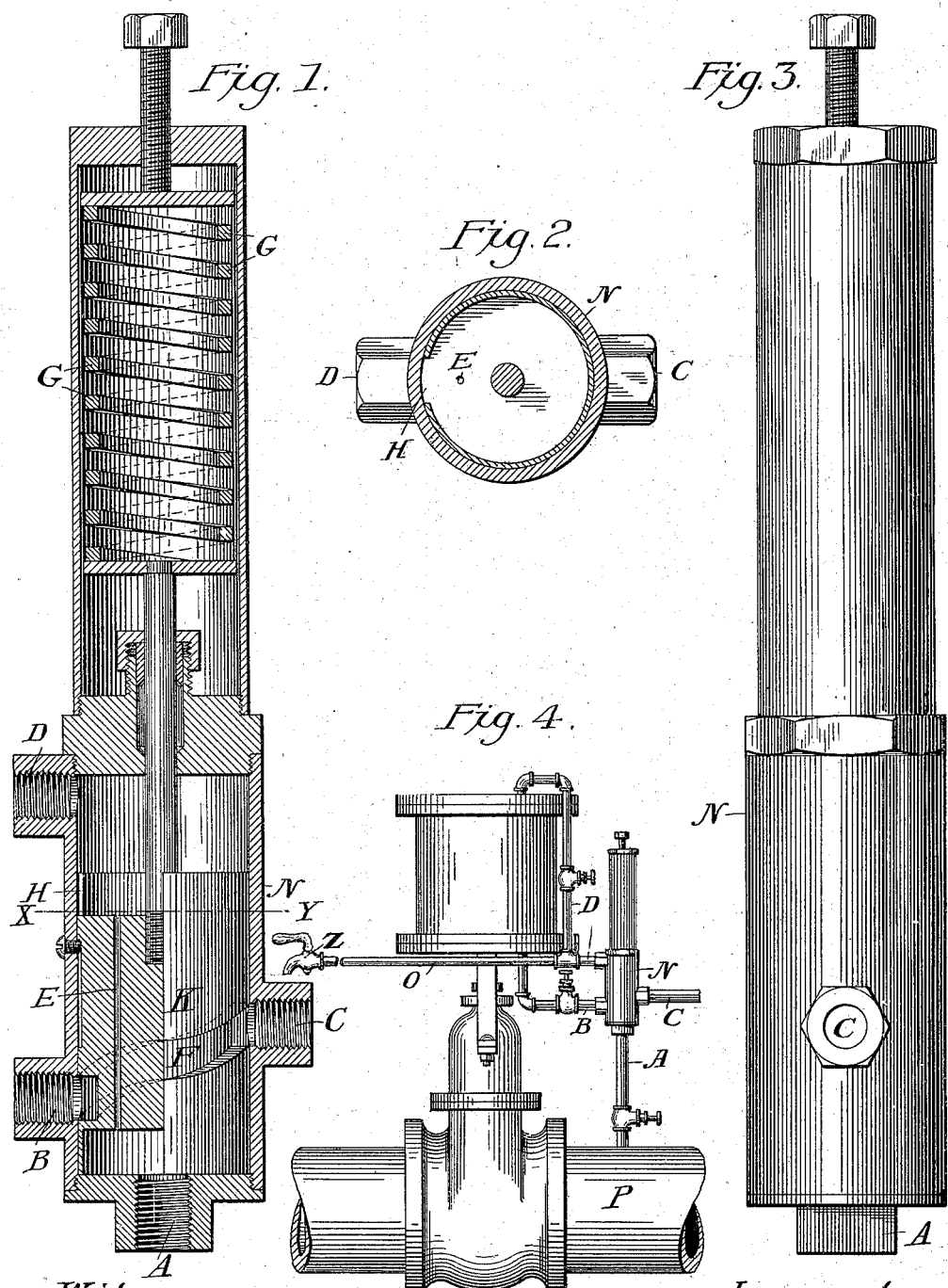

ARTHUR L. ADAMS, OF ASTORIA, OREGON.

AUTOMATIC GATE-GOVERNOR.

SPECIFICATION forming part of Letters Patent No. 558,919, dated April 28, 1896.

Application filed June 27, 1895. Serial No. 554,256. (No model.)

*To all whom it may concern:*

Be it known that I, ARTHUR L. ADAMS, of Astoria, in the county of Clatsop and State of Oregon, have invented a new and useful Means of Opening and Closing a Hydraulic or Piston Lift-Gate from a Distant Point; and I do hereby declare that the following is a full, clear, and exact description of the same.

The nature of my invention consists of the application to the cylinder of a hydraulic or piston lift-gate of a mechanical device, which is connected to the distant point from which the gate is to be operated by means of a small pipe, the opening and closing of which pipe cause the governor or device to admit the pressure fluid from the pipe in which the hydraulic lift-gate is placed into either end of the gate-cylinder and to release the fluid from the other end of the cylinder, thus causing the gate to either open or close at the will of the operator.

In the accompanying drawings, Figure 1, Plate 1, is a sectional view of the device, showing a section of the cylinder and connection for pipes and a half-section and half-elevation of the piston which operates in the cylinder, also the inclined groove or port which is cut around one or both sides of the piston and which gives free connection between the two lower side pipe-openings when the piston is at the lower end of the cylinder, and also showing a section of the spring which tends to hold the piston down to the lower end of cylinder and the adjusting-screw for regulating the tension of the spring. Fig. 2, Plate 1, shows a section of the piston on the transverse axis indicated. Fig. 3, Plate 1, shows a view or elevation of the governor as a whole; and Fig. 4, Plate 2, shows the method of application to a hydraulic or piston lift-gate.

To enable others skilled in the art to make use of my invention, I will proceed to describe its construction and operation.

In the cylinder N is a close-fitting piston K, which moves in opposition to the spring G. The cylinder N has provision for four pipe connections. (Marked A, B, C, and D.) Connections B and C freely communicate together by way of the inclined port F, cut around the piston K, when the piston is at the lower end of the cylinder. When the piston is raised, the opening C is closed by the piston and the opening B has free communication with the opening A. The opening D is always unobstructed, whatever the position of the piston, by reason of the edge of the piston being cut through at the point H. A small hole is drilled through the piston longitudinally, as shown at E, which makes a free communication between the two ends of the cylinder. This hole is drilled of such size as to have a less delivering capacity under the pressure at which the gate operates than the small pipe O, extending from the governor to the distant station from which it is desired to operate the gate.

In operation A is connected with the pressure pipe or main in which the gate is placed that is to be operated by the governor, B with the lower end of the gate-cylinder, C with the waste, and D with the upper end of the gate-cylinder, with a T-connection in one branch of which is connected the small pipe O, leading to the station from which the gate is to be operated. At the end of this pipe is placed a stop-cock or other convenient means of opening and closing the pipe. Under normal conditions the cock is closed, the water or other fluid having free access from the pressure-pipe P through A, E, and D to the upper end of the gate-cylinder, thus acting on the gate-piston and keeping the gate closed. There being an equilibrium in pressure in the two ends of the governor-cylinder, the spring G keeps the piston at the lower end of the cylinder. When it is desired to open the gate, the pipe at the controlling-station is opened, releasing the pressure in D, causing the piston to be thrown to the upper end of the cylinder, which act closes C and opens B to the passage of the fluid from A, which, acting on the lower end of the gate-piston, causes the piston to rise and the gate to open, while the fluid from the other end of the gate-cylinder escapes through the pipe O at the controlling-station. By closing the pipe at the controlling-station equilibrium is again gradually restored between the two ends of the governor-cylinder through the opening E, when the spring G throws the piston to the lower end of the cylinder, releasing the water or other fluid from the lower end of the gate-cylinder through the pipes and movable port B, C, and F, while the pressure, being again applied to the upper end of the gate-cylinder, operating on the piston therein, causes the gate to close. By reversing the connections between the governor and the gate-cylinder the gate can always be kept open instead of closed, while the pipe at the controlling-station is kept closed.

What I claim as my invention is—

1. A hydraulic governor consisting of a cylinder N, which has pipe connections A B and D with a pressure-main and with the two ends of the cylinder of a hydraulic or piston lift-gate; having also a short waste-pipe C, and a single line of pipe O leading to a distant point and a suitable cock therein, by which the gate is to be operated; a movable piston K within the cylinder N with an inclined passage F from one side to the other, and a small passage E extending longitudinally from one end to the other; and of a suitable device tending to hold the governor-piston in one extreme position, substantially as shown and described.

2. A hydraulic governor consisting of a cylinder N with four ports A B C and D, a movable piston K, with a small waste-passage E establishing permanent connection between the two opposing ports A and D, and a large inclined movable passage F establishing connection between the other two opposing ports B and C, and a suitable device G tending to hold the piston in one extreme position substantially as set forth.

ARTHUR L. ADAMS.

Witnesses:
LARS BERGSVIK,
A. S. RIFFLE.